(12) United States Patent
Hagel

(10) Patent No.: US 8,893,641 B1
(45) Date of Patent: Nov. 25, 2014

(54) WINDSHIELD MOUNTED VEHICLE POSITION GUIDE

(76) Inventor: Jeffrey Hagel, Murrieta, CA (US)

( * ) Notice: Subject to any disclaimer, the term of this patent is extended or adjusted under 35 U.S.C. 154(b) by 299 days.

(21) Appl. No.: 13/536,998

(22) Filed: Jun. 28, 2012

(51) Int. Cl.
*B62D 15/02* (2006.01)

(52) U.S. Cl.
USPC ........................................................ 116/28 R

(58) Field of Classification Search
CPC .... B62D 15/00; B62D 15/02; B62D 15/0205; B60Q 9/00
USPC .......................................... 116/28 R; 33/264
See application file for complete search history.

(56) References Cited

U.S. PATENT DOCUMENTS

| | | |
|---|---|---|
| 3,834,036 A | 9/1974 | Scarritt, Sr. |
| 4,016,653 A | 4/1977 | Bartlett |
| 4,079,519 A | 3/1978 | Carmouche |
| 6,688,007 B2 | 2/2004 | Ferron |
| 6,734,786 B2 | 5/2004 | Hoholik |
| 7,043,342 B1 | 5/2006 | Dewees |
| 7,543,545 B2 | 6/2009 | Matsumoto et al. |
| 7,650,698 B2 * | 1/2010 | Stewart, III ..................... 33/264 |
| 2002/0174822 A1 | 11/2002 | Royal |
| 2008/0246595 A1 * | 10/2008 | Sanders ........................ 340/438 |

* cited by examiner

*Primary Examiner* — Daniel S Larkin
*Assistant Examiner* — Irving A Campbell
(74) *Attorney, Agent, or Firm* — RG Patent Consulting LLC

(57) ABSTRACT

A vehicle position indicator and a method for applying same. The position indicator includes one or more members which are disposed in the user's field of view for citing an external reference to facilitate determining the position of the vehicle relative to the external reference yet without distracting the driver's view or attention. The invention contemplates the method of defining the position and location of the indicators. The exact location and orientation of the indicators are customized for the particular driver and even for the particular trip. Once the indicators are in place, the vehicle can be guided in a desired path of travel relative to the reference.

7 Claims, 4 Drawing Sheets

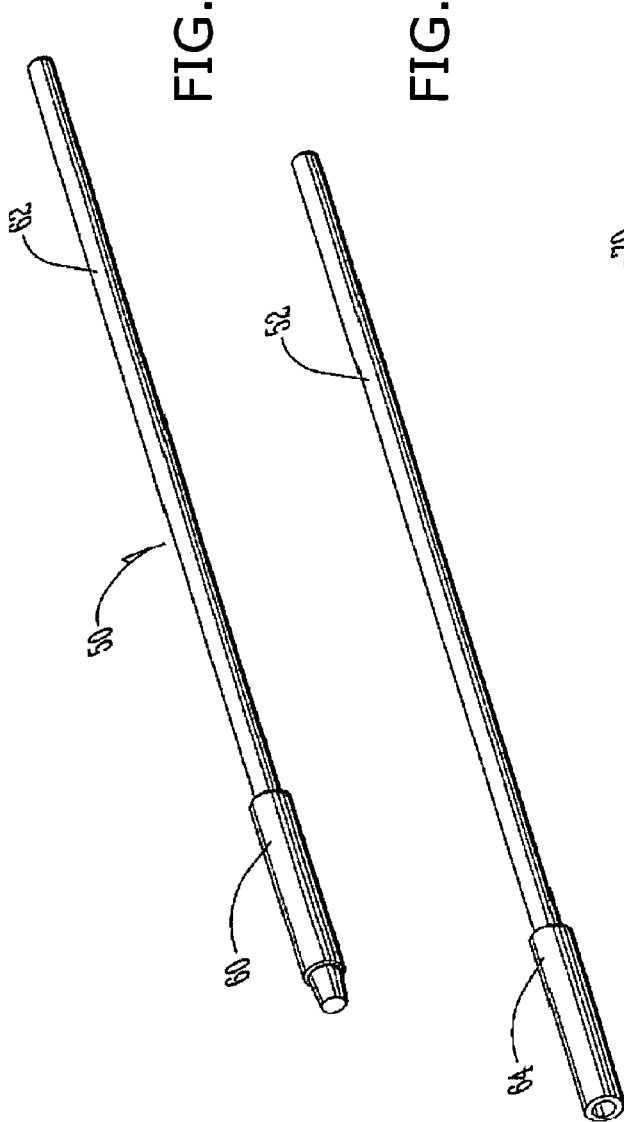

WINDSHIELD MOUNTED VEHICLE POSITION GUIDE

TECHNICAL FIELD OF THE INVENTION

The present invention relates in general to a vehicle position indicator and a method of installing it. The vehicle position indicator and installation method more particularly relates to techniques for improving driving safety for vehicles.

BACKGROUND OF THE INVENTION

The operation of vehicles, especially at high rates of speed, can often times be dangerous to the user and other vehicles in the vicinity, especially in inclement weather conditions, when the vehicle does not remain in the lane of traffic. Such problems are particularly aggravated when there are large vehicles, such as recreational vehicles and large trucks which can veer inadvertently over into an adjacent lane of oncoming traffic. Also, it could cause severe injuries and damage to the vehicle by the vehicle veering in the opposite direction off of the roadway and onto a shoulder or other road hazard.

Furthermore, all drivers of motor vehicles other than motorcycles experience a certain degree of uncertainty about exactly how far the passenger side of their vehicle will be from objects on that side of the road as they pass by them. With experience their margin of uncertainty and/or error decreases. In the case of wide vehicles such as trucks or motor homes, the inability to judge this distance in advance can lead to disaster or at the very least extreme nervousness even for an experienced driver. To some lesser degree this same problem occurs with the driver's side. In many other large vehicles, knowing exactly where the sides of the vehicle are can also be a problem for the driver.

Still further, drivers inexperienced in handling recreational type vehicles and other large vehicles encounter considerable difficulty in maintaining the vehicle centered in the lane in which it is driven. Since most of these vehicles are much longer and wider than automobiles, the vision of the driver is blocked to the rear and there is much greater likelihood for steering error than in the case of automobiles. It is presently necessary for the driver to rather frequently check the outboard rear view mirrors to see that the vehicle is remaining within its lane, and this distracts from the driver's concentration on the road ahead.

In view of the increasing extent to which large vehicles such as motor homes, "campers," and the like are being driven by persons inexperienced in handling vehicles of this size, serious safety problems have arisen and have increased rapidly in recent years. There is a tendency for nearly all new drivers to occasionally drive off the road and onto the right shoulder. When rough or soft shoulders are encountered, this can be dangerous. Accordingly, there is a need to provide a means for increasing the driving accuracy of large vehicles in order to reduce the potential for highway accidents. It is the primary goal of the present invention to meet this need.

The prior art includes a large number of feeler fingers and vertical rods designed to be fastened to bumpers and fenders. They were designed to let the driver know when the vehicle struck or was about to strike something but were not much help in warning the operator of danger before it happened.

Still further, many motor vehicles are constructed to assume a low bonnet height in order to improve design features and aerodynamic characteristics of the vehicles. In such motor cars, the fore end of the vehicle i.e., fore end of the bonnet) can hardly been seen, or can not be seen at all, from the driver's seat; on narrow streets and parking lots, however, there arises a need for the vehicle driver to accurately recognize a fore end position of the vehicle.

Some known devices include rods or the like mounted on the exterior of the vehicle either to actually sense, or feel, a roadway element to warn the driver of the proximity of the roadway element to the vehicle, or are mounted on the hood or the dashboard and act as sighting devices. All of these physical elements require the driver to move his attention from the road to the device thereby distracting the driver. Thus, such elements have a serious drawback of distracting the driver. Still further, these devices may be difficult or cumbersome to install.

Yet another significant drawback of currently available devices is the inability of such devices to be customized for the particular driver. While most drivers are sized within a certain range, all drivers have specific needs and idiosyncrasies when it comes to their driving, and these needs can vary between different trips. Thus, there is a need for a guidance device which can be customized for the particular needs and desires of each driver, and even for each specific trip.

Furthermore, often once a particular trip has been completed, it is desirable to remove equipment that has been installed for that particular trip so other equipment can be added that is customized for that particular trip. Therefore, there is a need for an indicator device that can be easily installed and also easily taken down. Prior devices do not meet this requirement.

Therefore, there is a need for a new and improved driving aid to assist the driver of the vehicle to maintain the proper or desired position of the vehicle in the lane for safety purposes without distracting the driver's attention from the roadway and which can be customized for a particular driver and even for a particular trip. A vehicle thus equipped is more likely to maintain a desired position relative to the roadway. The equipment and its installation should be inexpensive and easy to install and remove.

SUMMARY OF THE INVENTION

The present invention is embodied in a vehicle position indicator and a method for applying same. The position indicator includes one or more members which are disposed in the user's field of view for citing an external reference to facilitate determining the position of the vehicle relative to the external reference yet without distracting the driver's view or attention. The invention contemplates the method of defining the position and location of the indicators.

Once the indicators are in place, the vehicle can be guided in a desired path of travel relative to the reference.

The exact location, size and orientation of the indicators are customized for the particular driver and even for the particular trip. Since the position indicators are easily removed, they can be removed after serving a specific purpose for a specific trip and can then be easily replaced by other indicators which are customized for another trip. In this way, a driver can have indicators that are customized for each particular trip. Still further, if a driver is changed, the indicators can be easily and quickly customized for the new driver.

One form of the windshield position marker of the present invention includes a set of right and left windshield marks which extend from the base of the windscreen, or windshield, upwardly for a distance determined by the vehicle and the driver. For example, the marks wold extend upward about twelve inches in a Class A motor home. The guides would indicated to the driver of the vehicle where the vehicle is located in relation to the lane in which the vehicle is located, i.e., when the left windshield marker imposes on the centerline of the road, the vehicle is as far to the left of the lane as it can go without crossing over the line and into the adjacent lane. The same would apply to the right marker. This would also aid in parallel parking and making right turns in a long vehicle, such as a motor home. This "tool" would help the unskilled or those who lack confidence when driving large vehicles. It would also aid the elderly in the navigation of their vehicle.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 shows marker element of the present invention.

FIG. 5 shows a marker element handle of the present invention.

FIG. 6 shows a DVD which is included in the kit shown in FIG. 1.

DETAILED DESCRIPTION OF THE INVENTION

Figure 1:
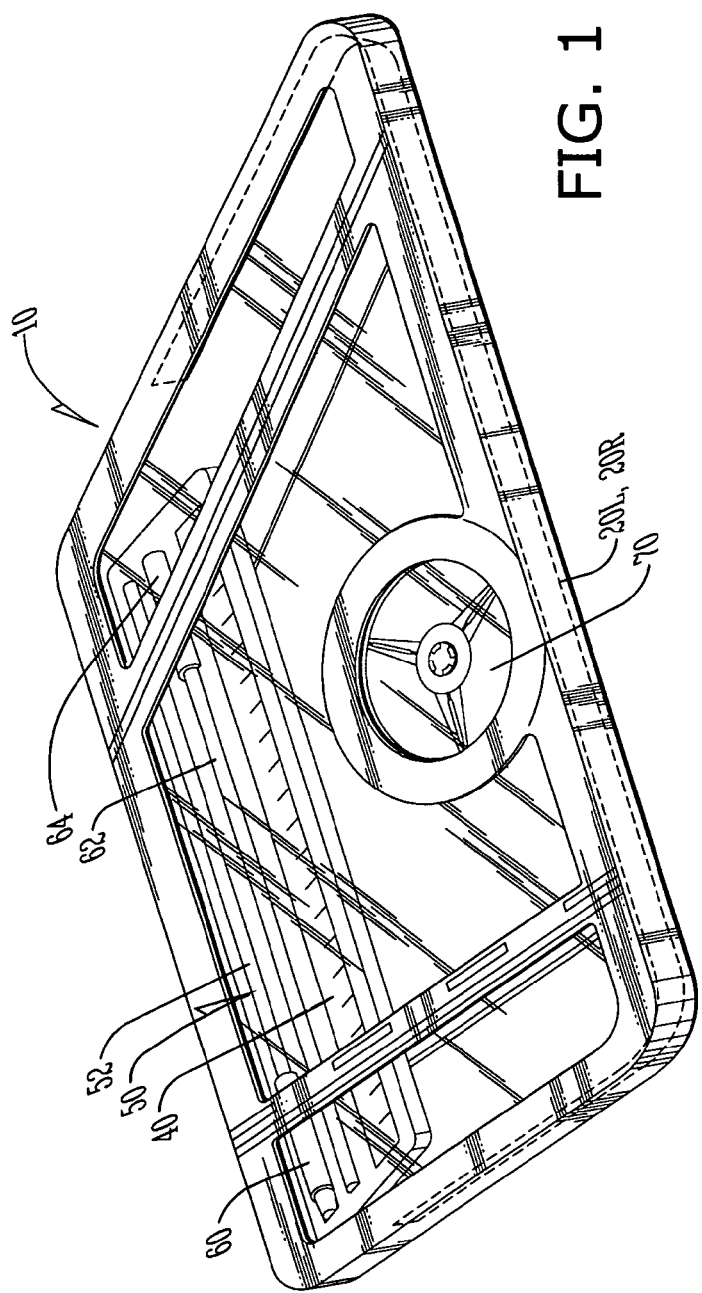
FIG. 1 is a perspective view of a kit containing the equipment used in the method embodying the teaching of the present invention.
Figure 2:
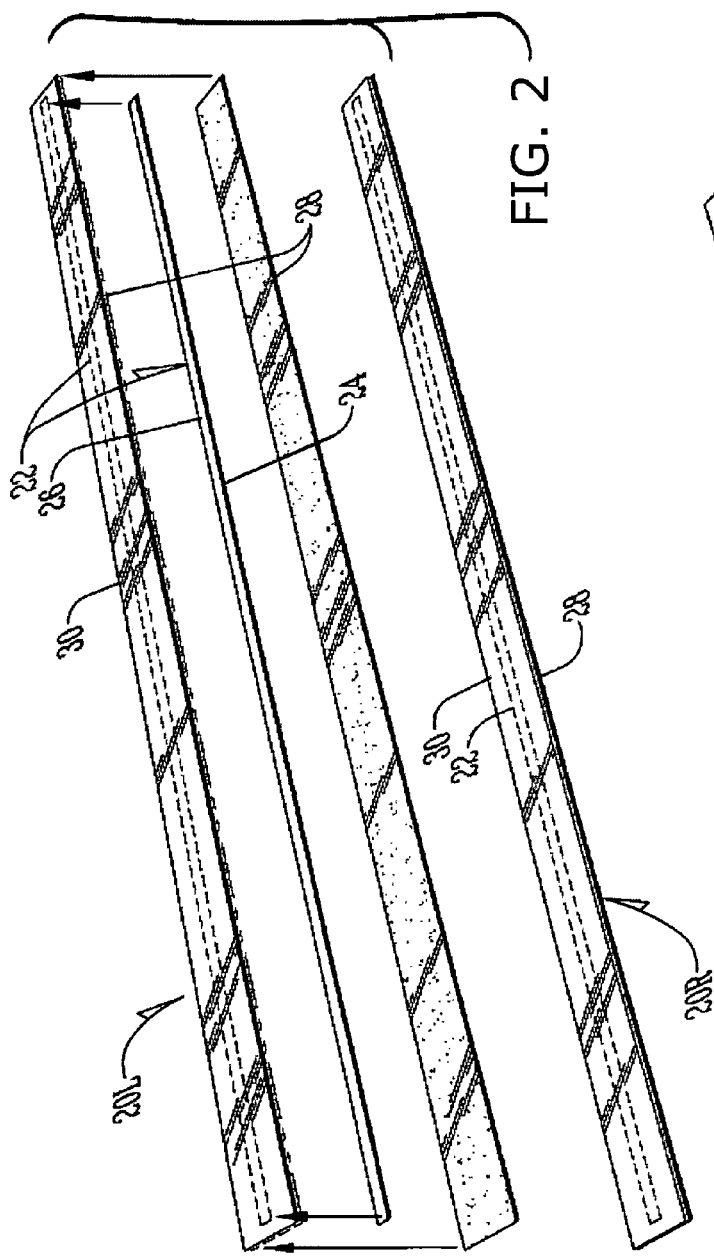
FIG. 2 shows guides of the present invention.
Figure 3:
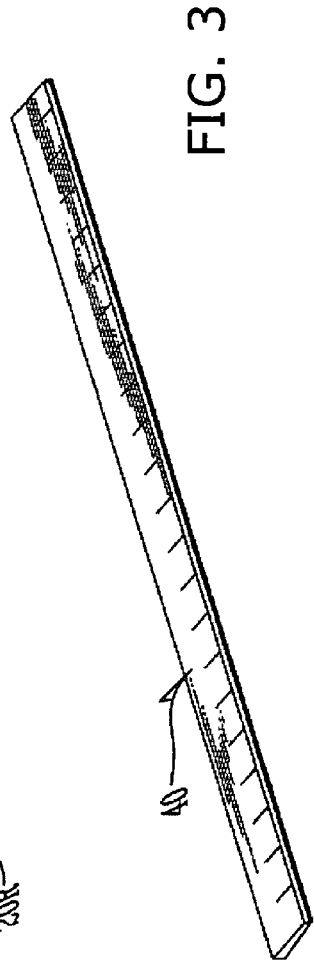
FIG. 3 shows a straight edge of the present invention.

Referring first to FIGS. 1-6, the roadway guide kit 10 embodying the present invention comprises roadway guides 20L and 20R which are placed on the inside of a vehicle windshield to provide a guide as to where a selected roadway element, such as a lane marker, a gutter, a curb, or the like, is with respect to a selected element of the vehicle, such as a side S of the vehicle, a mirror(s), such as side minors ML and MR, a boat, a trailer, or the like, as viewed by a driver in a driving position and orientation inside the vehicle whereby the driver can maintain the vehicle properly aligned with the selected roadway element by merely sighting the guides and maintaining them at a selected position and orientation with respect to the selected roadway element while he or she is driving the vehicle. Guides 20L and 20R comprise a dark line element, such as line 22 on guide 20L, which has adhesive on both front surface 24 and rear surface 26 as well as front release liner 28 and rear release liner 30, with the line element being sandwiched between the release liners. The operation and purpose of the guides and the release liners will be understood from the teaching of the present disclosure. It is also noted that while the present invention is disclosed in conjunction with road vehicles, the teaching of this invention can also be applied to off road vehicles, such as farm implements, such as tractors and the like, which also must be maintained in a desired alignment without departing from the scope of the present disclosure and claims.

Kit 10 further includes a straight edge 40 and a marker unit 50. Marker unit 50 includes a handle 52 on which a marker element 60 is releasably attached to one end 62 by a coupler element 64 for a use and purpose which will be understood from the teaching of this disclosure.

Kit 10 can also include an instructional DVD 70 if desired.

Having described the elements of the kit, its use in marking a windshield of a vehicle will now be described.

The vehicle, such as a motor home, truck or the like, is oriented with respect to selected roadway elements, such as roadway lines or the like so that the selected element of the vehicle is oriented with respect to the selected roadway element in a desired manner. For example, the outside of one side of the vehicle is located adjacent to one roadway line to be just inside that line. Other elements of the vehicle can be oriented and positioned in the same manner as will be understood by those skilled in the art based on the teaching of this disclosure. Since the vehicle has two sides, a right side and a left side (with the right and left being taken with respect to a forward-facing driver as in starboard side (right) and port side (left)).

The driver then positions himself behind wheel W in his normal driving position and orientation with respect to the windshield.

The driver then sights the selected roadway element and its position and orientation with respect to the selected vehicle element from his driving position and orientation. Once the desired relative position and orientation is established, using marker unit 50, a small mark is placed on the inside of the windshield to be on the selected roadway element as sighted by the driver for one side of the vehicle. Another mark is then placed on the inside of the windshield above the first mark so both marks are located at the desired position and orientation of the selected vehicle element with respect to the selected roadway element, such as on top of the selected roadway element as sighted by the driver from his driving position and orientation for the first side of the driver, for example his right side. A second set of marks is also placed on the inside of the windshield for a second selected roadway element which is located on the other side of the vehicle, in this example, his left side. The handle is useful in making the marks on the inside of the windshield of large vehicles since it may be cumbersome to reach marker 60 to the inside of the windshield over the steering wheel and dashboard of large vehicles.

After the marks are placed on the inside of the windshield, the marks are used to define guidelines by connecting the marks with straight lines on the outside of the windshield. The straight lines are made using straightedge 40 and marker element 60. Again, the handle may be useful in reaching marker 60 to the outside of the windshield of large vehicles.

The marks made on the inside of the windshield are then removed from the inside of the windshield leaving only the lines made on the outside of the windshield.

Using the lines on the outside of the windshield as guides, the guides 20L and 20R are placed on the inside of the windshield. The front surface release liner 24 is removed from one guide and the guide, such as guide 20L, is placed on the inside of the windshield to be co-linear and congruent with the line made on the outside of the windshield. The guide is then pressed against the inside of the windshield to adhere it to the inside of the windshield. Once the guide is properly adhered to the inside of the windshield, the rear side release liner is removed leaving only the line element adhered to the inside of the windshield in co-linear and congruent relationship with the line made on the outside of the windshield. The guide line element can then be cut so it will act as a guide without distracting the view of the driver. The top edge 90 of the guide line elements will be located so the guide line element will be located to be viewed when needed, but not in a place to distract the driver.

After the guides are in place on the inside of the windshield, the lines on the outside of the windshield are removed as by wiping them off. It is noted that the guides can be installed in any sequence desired.

Figure 7:
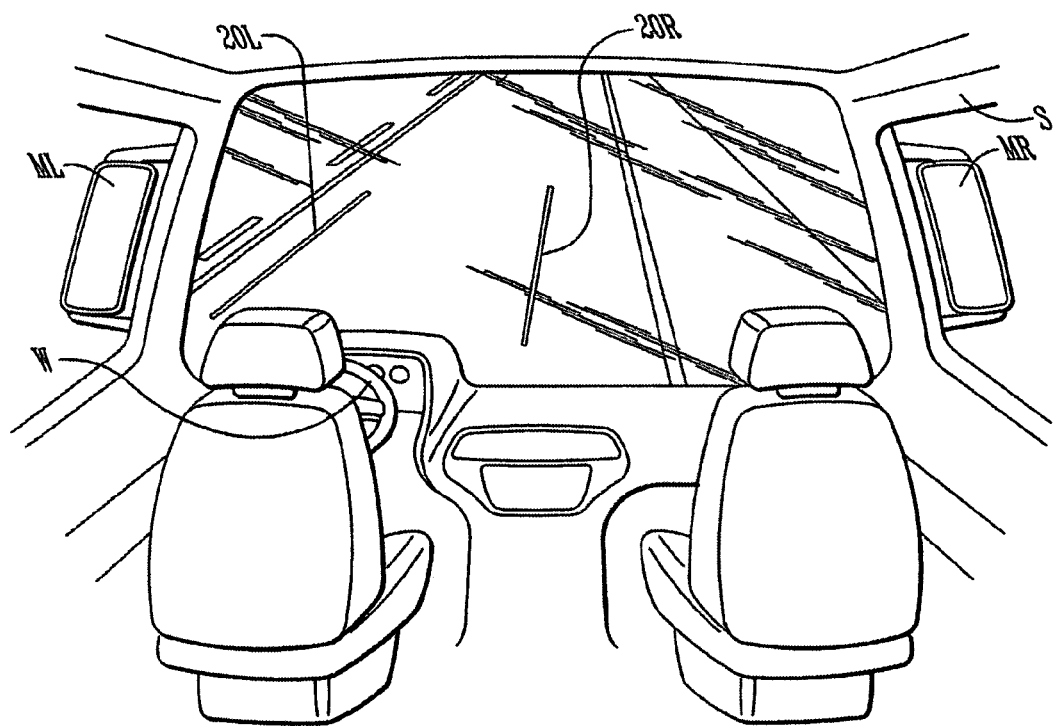
FIG. 7 shows the guides in place on the inside of a windshield of a vehicle.

The guide line elements on the inside of the windshield are then used to guide the driver and show him where his vehicle is with respect to the selected roadway element. The inplace guide line elements are shown in FIG. 7.

As can be understood from the foregoing, the guides are customized for the exact needs and desires of each driver. For example, the guides are cut to a length which permits them to extend up the windshield into a position which permits the driver to view the guides without distraction. If the guides are too long, they will distract the driver as he views the road, yet if they are too short, the driver will be required to divert his attention while he thinks about looking for the guides. With the guides known to the inventor, the length is set and thus these prior guides may be too long or too short for the particular needs and desires of the particular driver. Still further, the guides are set by the driver for the needs of the particular trip. Thus, for example, if the driver desires the guides to be just on the inside of the lane line for that particular trip, he can set the guides for this criterion; or the driver may desire the guides to be directly in the middle of the lane line for this particular trip, he can set the guides accordingly, and if the driver desires the guides to be just on the outside of the lane line for this trip, he can set them accordingly. On the other hand, if a different trip or a different driver requires different settings, the guides can be set accordingly using the teaching of the present disclosure and claims. Customization is thus easy and effective using the teaching of this disclosure.

Several guides can be used at one time. For example, a driver can have one set of guides to show the orientation and position of the outside of his vehicle with respect to roadway lane markers, another set to show the orientation and position of his side minors with respect to roadway line markers, and still another set of lines to show the orientation and position of a trainer or a boat with respect to the roadway line markers. If more than one set of guides are used, each set should be different from other sets. For example, one set can have thick guidelines, one set can have thin guidelines, one set can have colored lines, and so forth. The various guidelines are all formed and placed in the manner discussed above with respect to the selected element of the vehicle and the selected roadway element.

The driver then merely keeps the vehicle oriented to maintain the guidelines in the desired orientation and position with respect to the selected roadway element as the vehicle is driven. As can be understood from the teaching of the foregoing disclosure, the method embodying the present invention can be modified as needed to customize the guide system to the exact needs and desires of the particular driver whereby each driver will have a guidance system which is best fitted to his or her particular needs and desires.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method of marking a vehicle windshield with guides comprising:

A) providing a kit which includes at least one roadway guide which is placed on the inside of a vehicle windshield to provide a guide as to where a selected element of the vehicle, such as a side of the vehicle, a mirror, a boat, a trailer, or the like is with respect to a selected roadway element, such as a lane marker, a curb, a gutter or the like, as viewed by a driver in a driving position and orientation inside the vehicle whereby the driver can maintain the vehicle properly aligned with the selected roadway element by merely sighting the guide and maintaining the guide in a desired position and orientation with respect to the selected roadway element, the guide including a dark line element having adhesive on both a front surface and a rear surface of the line element, the guide further including a front release liner and rear release liner on the line element, with the line element being sandwiched between the release liners; the kit further including a straight edge, and a marker unit, with the marker unit having a handle, a marker element and a coupler element for releasably coupling the maker element to one end of the handle;

B) orienting the vehicle with respect to the selected roadway element so that the selected element of the vehicle is oriented with respect to the selected roadway element in a desired manner;

C) positioning the driver behind the wheel in the driver's normal driving position and orientation with respect to the windshield;

D) having the driver sight the selected roadway element and the selected vehicle element from the driver's driving position and orientation and locate the vehicle with respect to the selected roadway element in a desired relative position and orientation;

E) using marker unit, placing a first mark on the inside of the windshield to mark a desired position of the selected vehicle element with respect to the selected roadway element as sighted by the driver;

F) using the marker unit, placing another mark on the inside of the windshield above the first mark so both marks are located with respect to the selected roadway element and the selected vehicle element in a desired location and orientation as sighted by the driver from the driving position and orientation;

G) after the marks are placed on the inside of the windshield, using the marks and the straightedge to define guidelines by connecting the marks with straight lines on the outside of the windshield;

H) removing the marks from the inside of the windshield while leaving the lines made on the outside of the windshield;

I) removing the front surface release liner from the guide;

J) using one of the lines on the outside of the windshield as a guide, placing the guide line element on the inside of the windshield;

K) placing the guide line element on the inside of the windshield to be co-linear and congruent with the line made on the outside of the windshield, then pressing the guide line element against the inside of the windshield to adhere the guide line element to the inside of the windshield;

L) once the guide line element is properly adhered to the inside of the windshield, removing the rear side release liner and leaving only the line element adhered to the inside of the windshield in co-linear and congruent relationship with the line made on the outside of the windshield;

M) cutting the guide line element so the guide line element has a length which is desired by the driver and customizing the length, position and orientation of the guide line element for the driver and particular needs of the driver; and N) after the guide line element is in place on the inside of the windshield, removing the line corresponding to the guide line element on the inside of the windshield from the outside of the windshield.

2. The method defined in claim 1 wherein the selected element of the vehicle is one side of the vehicle.

3. The method defined in claim 1 wherein steps B)-N) are repeated for each of several selected roadway elements and several selected vehicle elements.

4. The method defined in claim 1 further including a step of cutting the guide line element after the guide line element has been placed on the inside of the windshield.

5. The method defined in claim 1 wherein the kit further includes an instructional DVD.

6. A method of marking a vehicle windshield with guides comprising:

A) providing a kit which includes at least one roadway guide which is placed on a vehicle windshield to provide a guide as to where a selected element of the vehicle, such as a side of the vehicle, a mirror, a boat, a trailer, or the like is with respect to a selected roadway element, such as a lane marker, a gutter or the like, as viewed by a driver in a driving position and orientation inside the vehicle whereby the driver can maintain the vehicle properly aligned with the selected roadway element by merely sighting the guide and maintaining the guide in a desired position and orientation with respect to the selected roadway element, the guide including a line element, the kit further including a straight edge, and a marker unit, with the marker unit having a handle;

B) orienting the vehicle with respect to the selected roadway element so that the selected element of the vehicle is oriented with respect to the selected roadway element in a desired manner;

C) positioning the driver behind the wheel in the driver's normal driving position and orientation with respect to the windshield;

D) having the driver sight the selected roadway element and the selected vehicle element from the driver's driving position and orientation and orienting and positioning the selected vehicle element relative to the selected roadway element according to the desires of the driver and customizing the relative orientation and position of the vehicle for particular desires of the driver;

E) placing a first mark on the inside of the windshield to mark a desired position of the selected vehicle element with respect to the selected roadway element as sighted by the driver;

F) placing another mark on the inside of the windshield above the first mark so both marks are located with respect to the selected roadway element and the selected vehicle element in a desired location and orientation as sighted by the driver from the driving position and orientation;

G) after the marks are placed on the inside of the windshield, using the marks to define guidelines by connecting the marks with straight lines on the outside of the windshield;

H) removing the marks from the inside of the windshield while leaving the lines made on the outside of the windshield;

I) using one of the lines on the outside of the windshield as a guide, mounting the guide line element on the inside of the windshield to be co-linear and congruent with the line made on the outside of the windshield;

J) once the guide line element is mounted on the inside of the windshield, removing the line corresponding to the guide line element on the inside of the windshield from the outside of the windshield; and K) cutting the guide line element to define a guide line element length which is desired by the driver whereby the length, position and orientation of the guide line element is customized for the driver and particular needs of the driver.

7. A method of custom marking a vehicle windshield with guides which are customized to particular needs of a particular driver comprising:

A) orienting a vehicle with respect to the selected roadway element so that a selected element of the vehicle is oriented with respect to a selected roadway element in a desired manner; and B) customizing a driving guide to a particular driver by (1) positioning a driver behind the steering wheel in the driver's normal driving position and orientation with respect to the windshield and the vehicle, (2) having the driver sight the selected roadway element and the selected vehicle element from the driver's driving position and orientation according to the desires of the driver and positioning the vehicle relative to the selected roadway element in accordance with the driver's particular desires and needs so the driving guide will be positioned and oriented in a manner which is customized for the driver, (3) placing a first mark on the inside of the windshield to mark a desired position of the selected vehicle element with respect to the selected roadway element as sighted by the driver, (4) placing another mark on the inside of the windshield above the first mark so both marks are located with respect to the selected roadway element and the selected vehicle element in a desired location and orientation as sighted by the driver from the driving position and orientation, (5) after the marks are placed on the inside of the windshield, using the marks to define guidelines by connecting the marks with straight lines on the outside of the windshield, (6) removing the marks from the inside of the windshield while leaving the lines made on the outside of the windshield, (7) using one of the lines on the outside of the windshield as a guide, mounting a guide line element on the inside of the windshield to be co-linear and congruent with the line made on the outside of the windshield, (8) cutting the guide line element to define its length according to the desires of the driver, and (9) once the guide line element is mounted on the inside of the windshield, removing the line corresponding to the guide line element on the inside of the windshield from the outside of the windshield.

\* \* \* \* \*